United States Patent
Yabe et al.

(10) Patent No.: US 6,699,926 B2
(45) Date of Patent: Mar. 2, 2004

(54) LUBRICANT-FEEDING MATERIAL

(75) Inventors: Toshikazu Yabe, Kanagawa (JP); Takahiko Uchiyama, Kanagawa (JP)

(73) Assignee: NSK Ltd., Tokyo (JP)

(*) Notice: Subject to any disclaimer, the term of this patent is extended or adjusted under 35 U.S.C. 154(b) by 286 days.

(21) Appl. No.: 09/983,462

(22) Filed: Oct. 24, 2001

(65) Prior Publication Data

US 2002/0049277 A1 Apr. 25, 2002

Related U.S. Application Data

(62) Division of application No. 09/671,180, filed on Sep. 28, 2000, which is a continuation of application No. 09/240,667, filed on Feb. 2, 1999, now abandoned.

(30) Foreign Application Priority Data

Feb. 3, 1998 (JP) .................................... P. 10-022167

(51) Int. Cl.$^7$ .................................................. C08K 5/01
(52) U.S. Cl. ........................ 524/476; 524/490; 524/491
(58) Field of Search ................. 524/476, 490, 524/491

(56) References Cited

U.S. PATENT DOCUMENTS

| | | |
|---|---|---|
| 3,541,011 A | 11/1970 | Davis et al. |
| 3,547,819 A | 12/1970 | Davis et al. |
| 3,729,415 A | 4/1973 | Davis et al. |
| 4,146,487 A | 3/1979 | Rumierz |
| 4,239,632 A | 12/1980 | Baile |
| 4,448,700 A | 5/1984 | Lankamp |
| 5,354,210 A | 10/1994 | Koblitz et al. |
| 5,405,909 A | 4/1995 | Ohmae et al. |
| 5,844,021 A | 12/1998 | Koblitz et al. |

FOREIGN PATENT DOCUMENTS

| | | |
|---|---|---|
| GB | 1163123 | 9/1969 |
| JP | 63-23239 | 5/1988 |

OTHER PUBLICATIONS

English language Abstract of JP 80–137198 and JP–B–63–23239.

*Primary Examiner*—Edward J. Cain
(74) *Attorney, Agent, or Firm*—Sughrue Mion, PLLC

(57) ABSTRACT

The present invention provides a lubricant-feeding material which can be used at a temperature as high as from 100° C. to 120° C., exhibits an excellent mechanical strength and stably maintains a lubricating oil having a high polarity such as ester oil and polyphenylether oil, which have excellent lubricating properties or heat resistance, or a grease comprising such a lubricating oil as a base oil in a large amount. The lubricant-feeding material comprises a polyester elastomer comprising a hard component made of a first polyester and a soft component made of a second polyester or polyether solidified containing a lubricating oil compatible with the polyester elastomer or a grease comprising the lubricating oil as a base oil, the lubricating oil oozing from the surface of the polyester elastomer.

3 Claims, 7 Drawing Sheets

LUBRICANT-FEEDING MATERIAL

This is a divisional of application Ser. No. 09/671,180 filed Sep. 28, 2000, which is a continuation of application Ser. No. 09/240,667 filed Feb. 2, 1999, abandoned, the disclosure of which is incorporated herein by reference.

FIELD OF THE INVENTION

The present invention relates to a lubricant-feeding material for feeding a lubricant or grease to the position to be lubricated. More particularly, the present invention relates to a lubricant-feeding material which can be applied to parts subject to exposure to high temperature such as rolling bearing, linear guide apparatus and ball screw apparatus.

BACKGROUND OF THE INVENTION

In general, parts requiring good lubricating properties such as bearing are filled with a lubricating composition such as lubricating oil and semisolid grease. However, these lubricating components, even if they are in the form of semisolid grease, not to mention lubricating oil, become fluidized as the temperature rises during the rotation of the bearing. In order to inhibit the scattering of these lubricating components, the filled part of the bearing must be sealed by a sealing member such as sealing plate, complicating the structure thereof. This sealing member may not be mounted on some parts such as small-sized bearing.

As a lubricating system requiring no sealing members there has been developed a solidified lubricant-feeding material composed of a mixture of a lubricating oil and a resin. This lubricant-feeding material has been put into practical use. This resin-based lubricant-feeding material allows a lubricating oil held in the resin to ooze to the surface thereof to exert a lubricating action. A polyethylene having a lubricating oil incorporated therein is disclosed in U.S. Pat. Nos. 3,729,415, 3,547,819 and 3,541,011. JP-B-63-23239 (The term "JP-B" as used herein means an "examined Japanese patent publication") discloses a lubricant-feeding composition comprising a lubricant grease held in an ultrahigh molecular polyethylene having a molecular weight of from about $1 \times 10^6$ to $5 \times 10^6$.

These lubricant-feeding compositions are worked into a material filling the bearing space formed by the inner race, outer race, rolling elements and cage of a rolling bearing as a lubricant-feeding material depending on the lubricating position.

However, the foregoing lubricant-feeding composition made of a polyethylene and a lubricating oil or grease comprises a polyethylene as a base and is thus disadvantageous in that it begins to soften at about 80° C. and then melts completely at a temperature of from 130° C. to 140° C. Therefore, when the temperature is as high as not lower than 80° C., the lubricant-feeding composition shows a drop of mechanical strength. Namely, if the lubricant-feeding composition is mounted in the bearing as a cage or fills the bearing space, there is a fear that it causes deformation or destruction while the rolling elements rotate at this high temperature.

Further, the polyethylene, which is a polyolefinic synthetic resin, has no functional groups having a high polarity, bonds (e.g., amide bond) or no aromatic rings present in its molecule and thus exhibits a poor compatibility with a lubricating oil having a high polarity such as ester oil and polyphenyl ether oil, which have excellent lubricating properties or heat resistance, or a grease comprising such a lubricating oil as a base oil. Therefore, if the polyethylene comprises such a lubricant incorporated therein singly or in combination with an oil having a low polarity being in an amount of not less than 50% by weight based on the total amount of the lubricants, it is difficult to form a lubricant-feeding material having a lubricant content of not less than 50% by weight based on the total weight of the lubricant-feeding composition. The resulting lubricant-feeding material, if successfully formed, allows the lubricant to ooze therefrom too early to maintain the desired capability of feeding a lubricant because the polyethylene exhibits an insufficient capability of holding a lubricant having a high polarity.

SUMMARY OF THE INVENTION

It is therefore an object of the present invention to provide a lubricant-feeding material which can be used at a temperature as high as from 100° C. to 120° C., exhibits an excellent mechanical strength and stably maintains a lubricating oil having a high polarity such as ester oil and polyphenylether oil, which have excellent lubricating properties or heat resistance, or a grease comprising such a lubricating oil as a base oil in a large amount.

The foregoing object of the present invention will become more apparent from the following detailed description and examples.

The foregoing object of the present invention is accomplished with a lubricant-feeding material comprising a polyester elastomer and at least one of a lubricating oil compatible with the polyester elastomer and a grease comprising the lubricating oil as a base oil, wherein the polyester elastomer comprises a first polyester as a hard component and a second polyester or polyether as a soft component and is solidified containing the at least one of the lubricating oil and grease and the lubricating oil oozes from the surface of the polyester elastomer.

BRIEF DESCRIPTION OF THE DRAWINGS

By way of example and to make the description more clear, reference is made to the accompanying drawings in which.

DETAILED DESCRIPTION OF THE INVENTION

Figure 1:
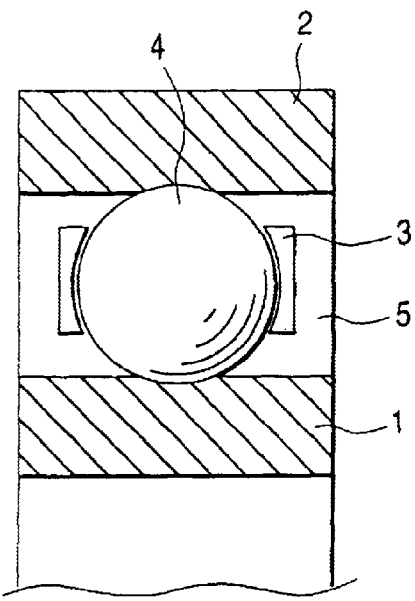
FIG. 1 is a sectional view of an essential part of an embodiment of the lubricant-feeding material according to the present invention which is applied to a rolling bearing.

The lubricant-feeding material according to the present invention will be further described hereinafter.

Firstly, the polyester elastomer employable herein will be described. The polyester elastomer is a copolymer of a hard component made of a first polyester and a soft component made of a second polyester or polyether.

The hard component is responsible for mechanical properties, particularly hardness or heat resistance, of the entire polyester elastomer. The soft component acts to hold a lubricant in the structure of the polyester elastomer. Accordingly, the lubricant-feeding material according to the present invention exhibits excellent heat resistance and mechanical properties as well as an excellent capability of holding a lubricant. The polyester elastomer has a greater flexibility than polyethylene and thus is suitable particularly for parts which must be deformed such as bearing seal.

The first polyester constituting the hard component is a crystalline polyester. Specific examples of such a polyester include aromatic polyesters such as polyethylene terephthalate, polybutylene terephthalate and polymer of polytetramethylene glycol and 2,6-naphthalenedicarboxylic acid. The first polyester preferably has a molecular weight of 4,000 to 48,000.

These first polyesters may be used singly or in admixture.

On the other hand, the second polyester as soft component is an aliphatic polyester, which preferably has a molecular weight of 4,000 to 48,000. Preferred examples thereof include those represented by the following chemical formula (I):

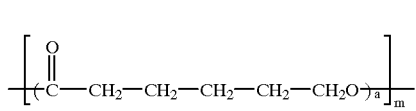
(I)

wherein a represents from 8 to 18 and m represents from 4 to 53.

The polyether as soft component is an aromatic polyether, which preferably has a molecular weight of 4,000 to 48,000. Preferred examples thereof include those represented by the following chemical formula (II):

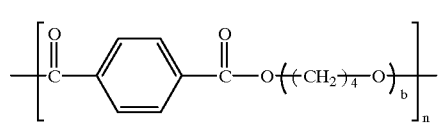
(II)

wherein b represents from 10 to 30 and n represents from 2 to 60.

The foregoing hard and soft components may be arbitrarily combined. In practice, however, a polyester elastomer comprising a polybutylene terephthalate as a hard component is particularly preferred taking into account the main purpose of the present invention (e.g., a filler substitute for grease for rolling bearing, a member which also serves as a seal provided between side seal for linear guide and slider main body, a member mounted on the end face of a ball screw, and a filler for filling the space between the roller of self-aligning rolling bearing and the inner race, outer race and guide race).

In the foregoing use, the hardness of the polyester elastomer is preferably from 40 to 60 (Shore D hardness), particularly from 45 to 55 (Shore D hardness). The lower the hardness of the polyester elastomer is, the more lubricant can be contained therein. However, the polyester elastomer softens when it comprises a lubricant incorporated therein. Taking into account its mechanical strength, the lower limit of the hardness of the polyester elastomer is 40 (Shore D hardness). On the contrary, if the hardness of the polyester elastomer exceeds 60 (Shore D hardness), the content of the soft component containing a lubricant is reduced so much. Thus, it is difficult to contain a lubricant in an amount as large as more than 50% by weight. The Shore D hardness can be measured according to ASTM D2240.

Accordingly, the ratio of hard component to soft component is adjusted such that the hardness of the polyester elastomer falls within the above defined range. Further, this hardness can be adjusted by selecting the length a and b of the repeating units in the foregoing chemical formulae (I) and (II), respectively.

By incorporating a lubricating oil or grease in the foregoing polyester elastomer, the lubricant-feeding material of the present invention can be obtained.

The lubricating oil employable herein needs to be compatible when heated to a temperature of not lower than the melting point of the polyester elastomer. The lubricating oil can be incorporated in the foregoing polyester elastomer so far as its content is extremely small regardless of its kind. The term "compatible" as used herein is meant to indicate a system having a lubricating oil content as very great as about 1:1 as calculated in terms of weight ratio to polyester elastomer which exhibits complete compatibilization at a temperature of not lower than the melting point of the polyester elastomer and shows uniform integration without separation into two layers after cooling and solidification. Specific examples of the lubricating oil compatible with the polyester elastomer include polyphenylether oils such as tetraphenylether represented by the following chemical formula:

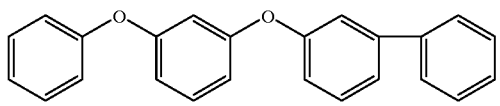

and pentaphenylether, ester oils such as dioctyl sebacate, dioctyl phthalate, trioctyl trimellitate, triisodecyl trimellitate, tetraoctyl pyromellitate, pentaerythritol tetraester and dipentaerythritol hexaester, and polyalkylene glycol oils. Preferred among these lubricating oils are those having phenyl group in their structure because they have a higher compatibility.

The foregoing lubricating oils have a high polarity and thus may not be incorporated in some polyester elastomers in the amount described later. Accordingly, the foregoing lubricating oils maybe used in admixture with a lubricating oil having a small polarity such as mineral oil, dialkyldiphenylether oil and poly-α-olefin oil. In this case, the blended amount of such a lubricating oil having a small polarity is not more than 30% by weight based on the total weight of the lubricating oil. If the blended amount of such a lubricating oil exceeds the above defined range, the mixture disadvantageously exhibits a deteriorated compatibility with the polyester elastomer.

The grease, if used, is produced by blending the foregoing lubricating oil as a base oil with a lithium soap, urea compound or the like as a thickener. The grease is preferably used because it stays semisolid before solidification and thus can easily fill the space in bearing, etc.

However, if the polyester elastomer is in the form of pellet, the grease may hardly be mixed uniformly with the polyester elastomer even when heated to a temperature of not lower than the melting point of the polyester elastomer. Therefore, this pelletized polyester elastomer is preferably pulverized into powder before use, for example, by freeze-crushing. On the contrary, the lubricating oil to be used herein does not need to be in the form of powder.

Referring to the ratio of the lubricating oil or grease (hereinafter referred to as "lubricant") to the polyester elastomer, the content of the lubricant is preferably from 20 to 80% by weight, particularly from 40 to 70% by weight based on the weight of the lubricant-feeding material.

If the content of the lubricant falls below 20% by weight, the supplied amount of the lubricant is reduced, eliminating the capacity of feeding lubricant too early. On the contrary, if the content of the lubricant exceeds 80% by weight, the content of the constituent polyester elastomer is too small to obtain the predetermined mechanical strength.

The lubricant-feeding material of the present invention may comprise various deterioration-inhibiting additives such as antioxidant, ultraviolet absorber and hydrolyzation inhibitor, various reinforcing materials such as glass fiber, potassium titanate whisker and aluminum borate whisker or various solid lubricants such as PTFE and $MoS_2$ incorporated therein.

The lubricant-feeding material of the present invention may be produced as follows.

A pelletized or powdered polyester elastomer and a lubricant are mixed at a temperature of not lower than the melting point of the polyester elastomer to attain uniform compatibilization. The molten mixture is then poured into a mold having the desired shape where it is then cooled and solidified.

The lubricant-feeding material of the present invention may be produced also by injection molding. In this case, an ordinary injection molding machine equipped with a pre-filling hopper can hardly weigh and mold the powder obtained by grinding a solidified matter or paste prepared from the solidified matter as it is. The use of an improved injection machine having a pumping hopper as described in JP-A-8-309793 allows the powder or paste to be fairly caught by the screw, enabling weighing and molding.

In the case of production by injection molding, an ordinary injection molding grade raw material, if used as a polyester elastomer, exhibits too low a melt viscosity when mixed with a lubricant, making it more likely to cause the generation of fin and fail to obtain a satisfactory molded. In order to appropriately adjust the melt viscosity of the raw material, an extrusion molding grade material having a high original melt viscosity (preferably melt index of not more than 3.0 at a temperature of from 220 to 230° C.) may be used. When mixed with a lubricant, such an extrusion molding grade material exhibits an appropriately reduced melt viscosity that allows stabilized injection molding.

If the lubricant-feeding material is used to fill the space in a bearing as a substitute for grease, it is preferred that a molten mixture of a polyester elastomer and a lubricant be directly injected into the space where it is then solidified.

Specific examples of application of the lubricant-feeding material of the present invention include filler as substitute for grease for rolling bearing, member which also serves as not only a side seal but also a seal provided in slider main body of linear guide, member mounted on the end face of a ball screw, and member provided in the space among the roller, inner race, outer race, and guide race of self-aligning rolling bearing. Preferred embodiments of implication of the present invention will be given below.

First Embodiment: Rolling Bearing

As shown in a radially sectional view of FIG. 1, a rolling bearing comprises a plurality of rolling elements 4 rollably retained between an inner race 1 and an outer race 2 with a cage 3 provided interposed therebetween.

In the present invention, injected into the space formed by the inner race 1, the outer race 2, the cage 3 and the rolling elements 4, which has heretofore been filled by a grease or the like, is a molten mixture of the foregoing polyester elastomer and lubricant which is then solidified to form a lubricant-feeding material 5. The method for filling the space with the molten mixture is not specifically limited. For example, using a grease injector with a heating mechanism, the foregoing molten mixture may be injected into the space where it is then allowed to stand and solidify to form a lubricant-feeding material 5. Alternatively, the space in the bearing may be filled with an unmolten mixture which is then heated and allowed to stand. Alternatively, so-called insert molding may be conducted. In other words, the lubricant-feeding material may be molded with a bearing inserted in the mold.

Figure 2:
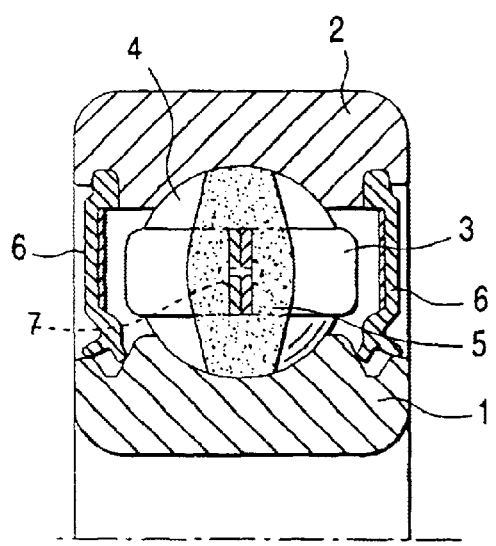
FIGS. 2(a) and 2(b) each is a sectional view of an essential part of another embodiment of the lubricant-feeding material according to the present invention which is applied to a rolling bearing (FIG. 2(a) is radially sectional view, and FIG. 2(b) is a side view)
Figure 2:
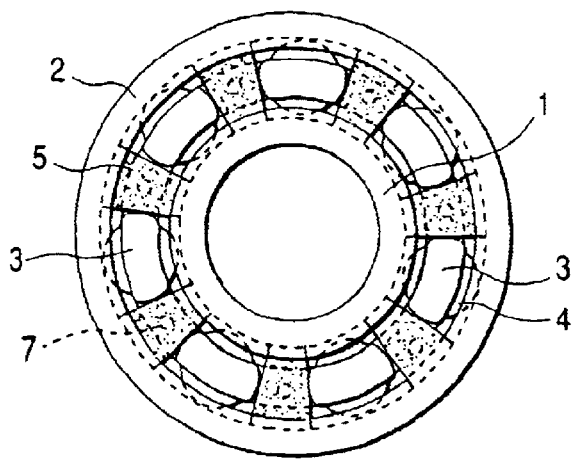

Referring to how the rolling bearing is filled with the lubricant-feeding material 5, the lubricant-feeding material 5 may also fill the space (indentation) between the rolling elements 4 and 4 in the cage 3 as shown in FIG. 2 (a) and (b) besides in FIG. 1. The rolling bearing of the present example is provided with a sealing member 6. In order to fill the rolling bearing with the lubricant-feeding material 5, a molten mixture of the polyester elastomer and lubricant is injected into the foregoing indentation through a grease injector equipped with a heating mechanism with one side face of the rolling bearing facing upward, and then allowed to stand and solidify. Subsequently, the molten mixture is similarly injected and solidified on the other side face. After the termination of solidification, the sealing members 6, 6 are mounted on the both ends of the outer race.

FIG. 2 (a) is a radially sectional view. FIG. 2 (b) is a side view of the rolling bearing of FIG. 1 with the sealing member 6 being removed. The reference numeral 7 indicates a rivet which annularly connects a pair of cages 3.

In the various rolling bearings arranged as mentioned above, the lubricant contained in the lubricant-feeding material 5 gradually oozes therefrom to lubricate the inner race 1, the outer race 2, the cage 3 and the rolling elements 4.

Second Embodiment: Linear Guide Apparatus

The present invention provides a linear guide apparatus comprising a guide rail, a slider, rolling elements, and a seal element which seals the opening of gap between the guide rail and slider and is disposed at both end sides of the slider, wherein the lubricant-feeding material of the present invention is disposed adjacently or near to a lip portion, which is in contact with the guide rail, of the seal element.

Figure 3:
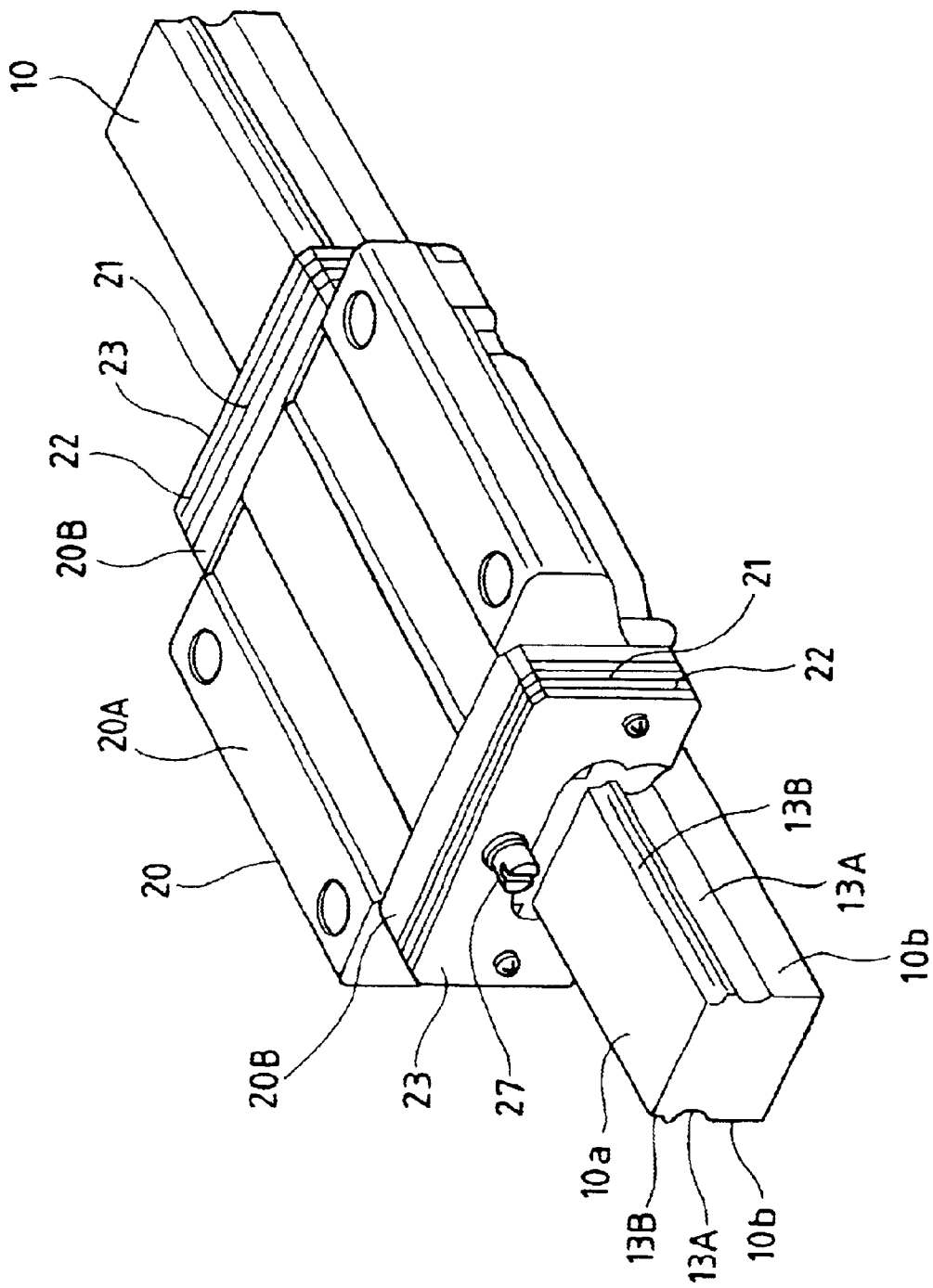
FIG. 3 is a perspective view of an embodiment of the lubricant-feeding material according to the present invention which is applied to a linear guide apparatus.

As shown in FIG. 3, a linear guide comprises a guide rail 10 extending axially with rolling element rolling grooves 13A, 13B provided on the outer surface thereof and a slider mounted straddling the guide rail 10.

The slider 20 comprises a main body 20A and an end cap 20B attached to both ends thereof. The slider main body 20A comprises a load rolling element rolling groove (not shown) on the inner side at both wings thereof opposed to the rolling element rolling grooves 13A, 13B on the guide rail 10 and rolling elements return path axially passing through the thick part of the wing. The end cap 20B comprises a curved path (not shown) connecting the rolling element rolling groove to the rolling element return path provided parallel thereto on the slider main body 20A. The rolling element rolling groove, the rolling element return path and the curved path provided on both ends of the slider main body form a rolling element circulating path. The rolling element circulating path is loaded with many rolling elements made of, e.g., steel ball. Shown at the reference numeral 27 is a grease nipple.

Figure 4:
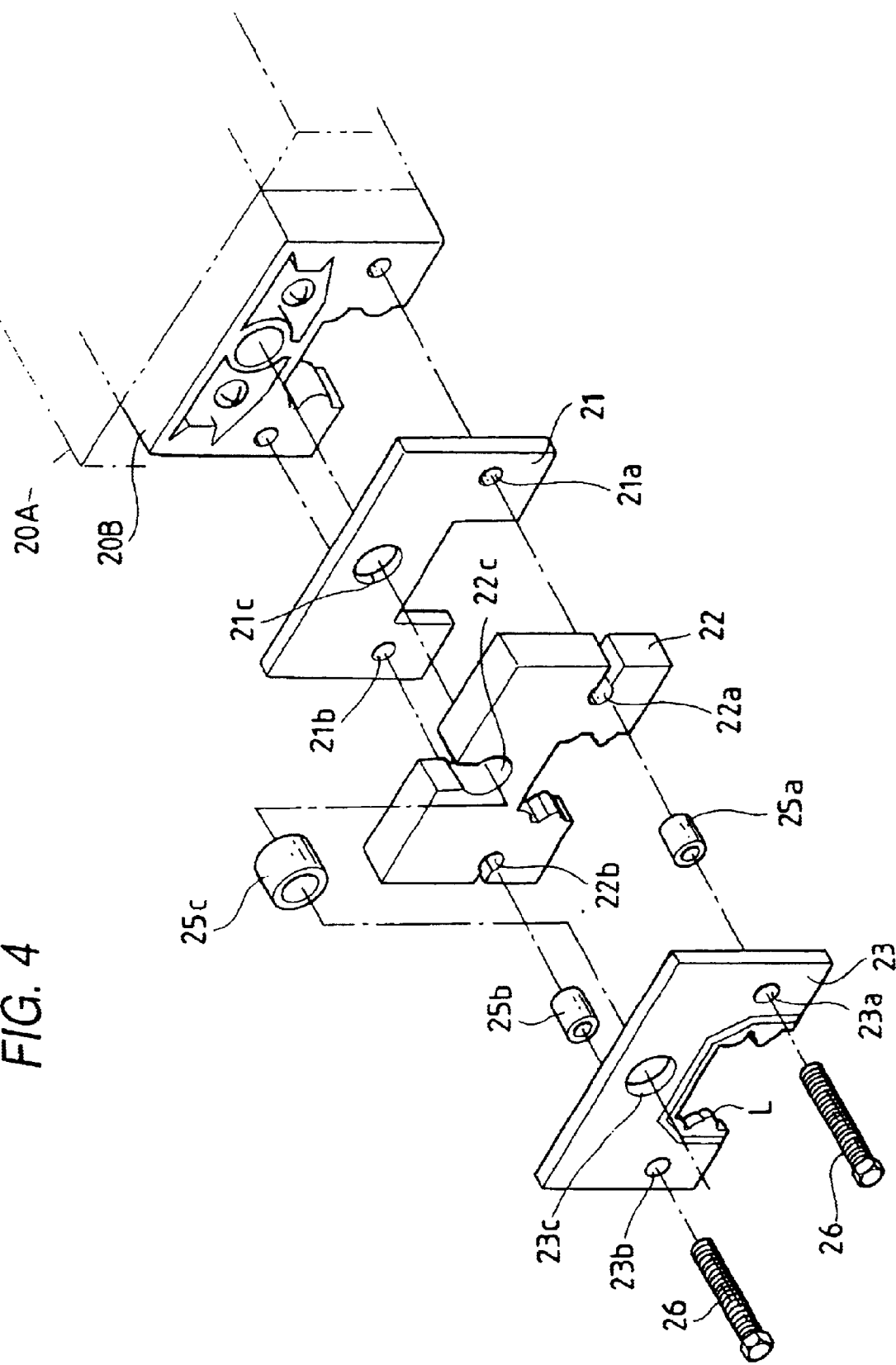
FIG. 4 is a diagram illustrating the structure of a slider containing a lubricant-feeding member in the linear guide apparatus shown in FIG. 3.

The end cap 20B is an injection-molded product of synthetic resin having an almost U-shaped section. As shown in FIG. 4, which is a perspective view illustrating the assembly of the end portion of the slider 20, both the end caps 20B have a reinforcing sheet 21, a lubricant-feeding member 22 and a side seal 23 (as a seal element) fixed on the outer side thereof in stack in order of nearness to the end cap 20B.

The reinforcing sheet 21 is a steel plate formed in an almost U-shape corresponding to the shape of the end cap 20B. The reinforcing sheet 21 comprises through-holes 21a, 21b for mounting screw 26 formed on both wings thereof. Formed in the connecting portion connecting both wings is a though-hole 21c for grease nipple. The reinforcing sheet 21 is not in contact with the guide rail 10.

The side seal 23 is formed by a steel plate formed in an almost U-shape corresponding to the shape of the end cap 20B and a nitrile rubber having a shape similar to that of the steel plate formed integrally on the outer surface of the steel plate. The inner surface of the lip portion L which comes in contact with the guide rail 10 of the side seal 23 is shaped to come in sliding contact with the upper surface 10a and outer surface 10b of the guide rail 10 following the section of the guide rail 10 or the rolling element rolling grooves 13A, 13B so that the lip portion L can seal the gap between the slider 20 and the guide rail 10.

The side seal 23, too, comprises through-holes 23a, 23b for mounting screw and a through-hole 23c for grease nipple formed therein.

Figure 5:
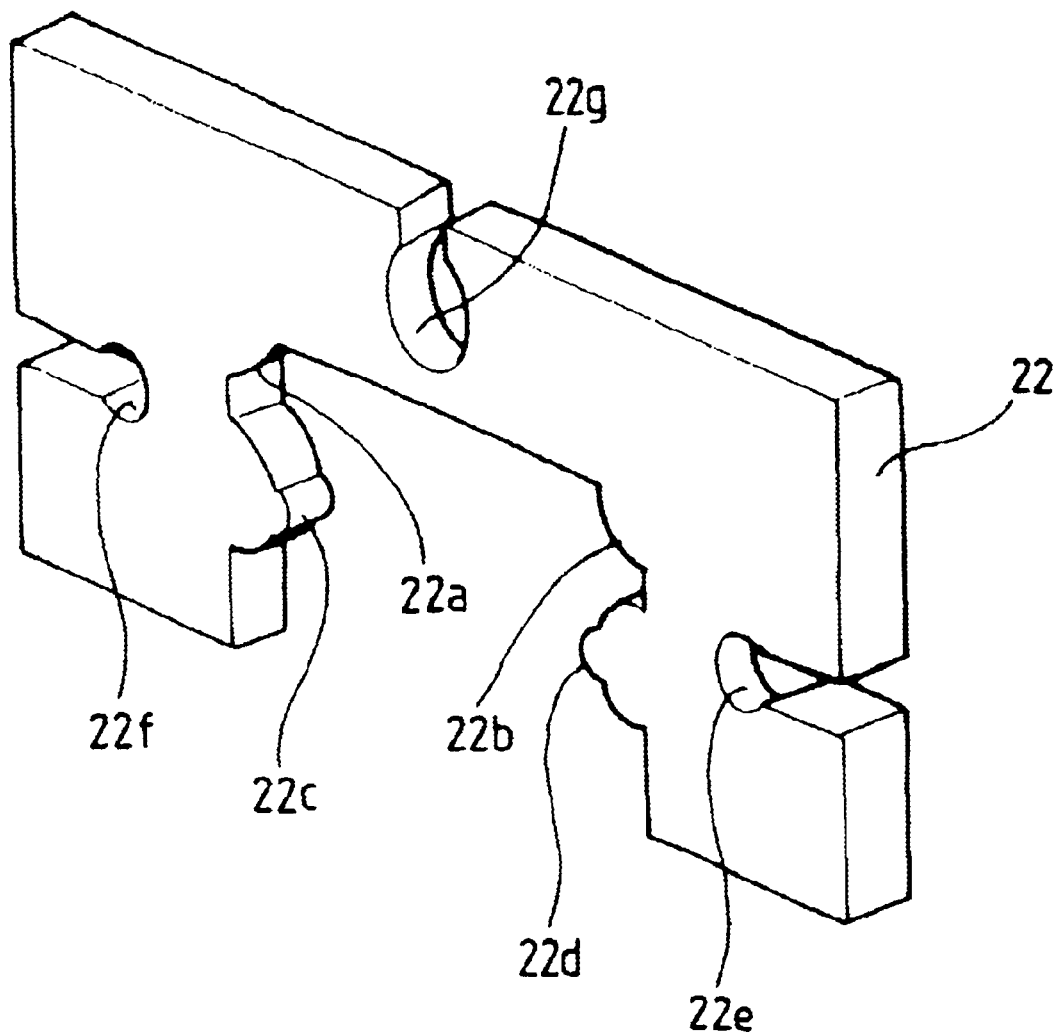
FIG. 5 is a perspective view of the lubricant-feeding member shown in FIG. 4.

As shown in FIG. 5, the lubricant-feeding member 22 provided interposed between the reinforcing sheet 21 and the side seal 23 is formed in an almost U-shape corresponding to the shape of the end cap 20B. The inner surface of the U-shape follows the upper surface 10a and side surface 10b of the guide rail 10. Formed on the inner surface of the U-shape are protrusions 22a, 22b corresponding to the upper rolling element rolling groove 13B on the guide rail 10 and protrusions 22c, 22d corresponding to the lower rolling element rolling groove 13A on the guide rail 10 which are shaped following the crosssectional contour. The lubricant-feeding member 22 comprises through-holes 22e, 22f for mounting screw and a through-hole 22g for grease nipple formed therein.

In the present invention, the lubricant-feeding member 22 is a lubricant-feeding material made of polyester elastomer and lubricant. The lubricant retained in the lubricant-feeding member 22 is supplied onto the surface thereof which comes in contact with the guide rail 10.

Shown at the reference numerals 25a to 25c in FIGS. 4 and 5 are ring sleeve members.

Third Embodiment: Ball Screw Apparatus

The present invention provides a ball screw apparatus comprising a screw shaft, a nut, and balls, wherein the lubricant-feeding material of the present invention is disposed in the nut such that the lubricant-feeding material is in contact with the screw outside surface (31c in FIG. 6) of the screw shaft.

Figure 6:
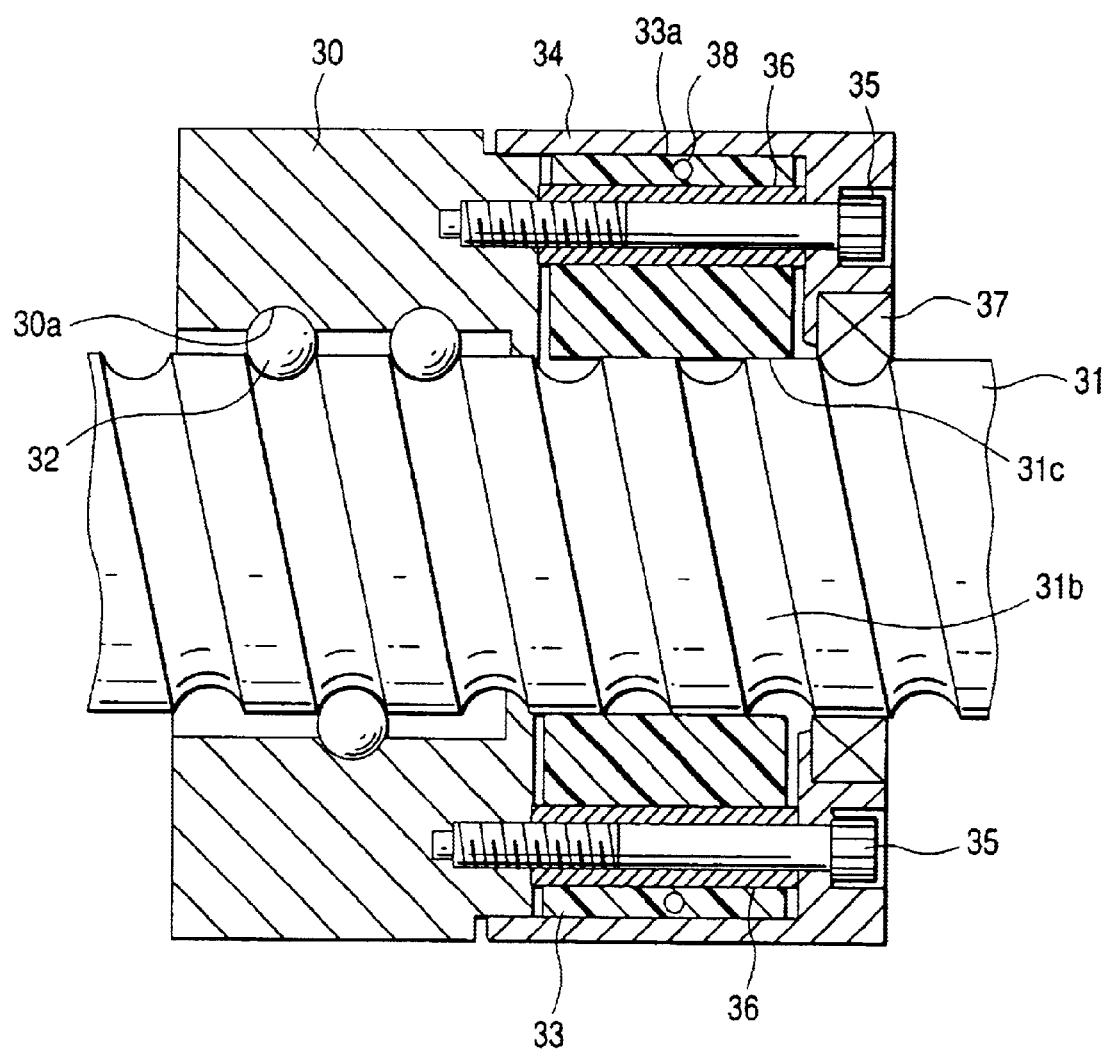
FIG. 6 is a sectional view of an essential part of an embodiment of the lubricant-feeding material according to the present invention which is applied to a ball screw apparatus.

As shown in FIG. 6, a ball screw apparatus comprises a ball nut 30 provided containing a screw shaft 31. A plurality of balls 32 are rollably disposed interposed between a thread groove 30a formed on the inner surface of the ball nut 30 and a thread groove 31b formed on the outer surface of the screw shaft 31 opposed to the thread groove 30a.

A cylindrical seal cap 34 is mounted on one end (right side as viewed in the drawing) of the ball nut 30 with a bolt 35 with a lubricant-feeding member 33 provided interposed therebetween. Mounted on the periphery of the axis portion of the bolt 35 is a sleeve 36. Mounted on the end of the seal cap 34 is a labyrinth seal 37. The labyrinth seal 37 is provided interposed between the screw shaft 31 and the seal 34 to prevent foreign matters such as dust from entering into the apparatus.

In the present invention, the lubricant-feeding member 33 is a lubricant-feeding material made of polyester elastomer and lubricant. A fine groove 33a is formed on the outer surface of the lubricant-feeding member 33. The lubricant-feeding member 33 is pressed radially against the outer surface of the screw shaft 31 at a constant pressure by a gutter spring 38 disposed in the groove 33a. In this arrangement, even if the inner surface of the lubricant-feeding member 33 is abraded after a prolonged operation, the lubricant-feeding member 33 can be kept in appropriate contact with the screw shaft 31, keeping the ball screw apparatus fairly lubricated.

Fourth Embodiment: Self-aligning Rolling Bearing

Figure 7:
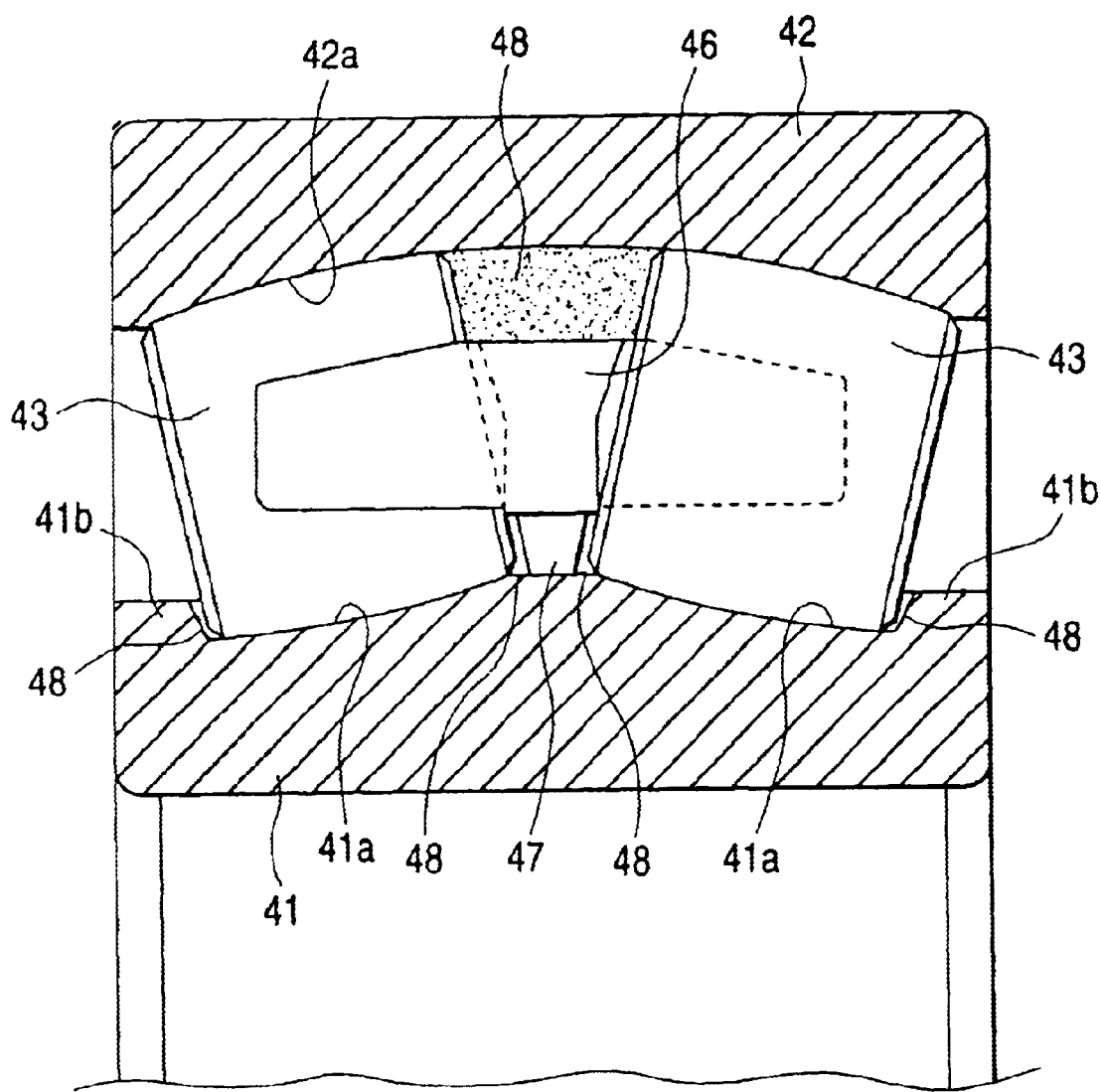
FIG. 7 is a sectional view of an essential part of an embodiment of the lubricant-feeding material according to the present invention which is applied to a self-aligning rolling bearing.

A self-aligning rolling bearing comprises an inner race 41 and an outer race 42 as shown in FIG. 7. The inner race 41 comprises two lines of rails 41a. Provided at the ends of the rails 41a is a rib for prevention of falling 41b. The outer race 42 comprises rails 42a provided opposed to the rails 41a on the inner race 41. Two lines of rollers 43 are provided between the rails 41a on the inner race 41 and the rails 42a on the outer race 42. The rollers 43 in each line are retained by a cage 46 integrally formed therewith. In other words, one cage 46 retains the roller 43 in each line. The cage 46 is made of high tensile brass, plastic (e.g., nylon 66) reinforced with glass fiber or the like. Taking into account the reliability such as strength, the cage 46 is preferably made of high tensile brass. Alternatively, the cage 46 may be formed by integrally electron beam-welding an iron separate cage to a bearing which has previously been assembled. Guide races 47 are disposed between the cage 46 and the inner race 41 in such an arrangement that the rollers 43 in each line can be guided.

A molten mixture of polyester elastomer and lubricant is injected into the space between the inner race 41 and the outer race 42, the gap between the ribs for prevention of falling 41b of the inner race 41 and the outer end of the rollers 43 in each line and the gap between the inner surface of the rollers 43 in each line and the guide races 47, and then solidified to give a lubricant-feeding material 48.

In the self-aligning rolling bearing thus assembled, the lubricant retained in the lubricant-feeding material 48 gradually oozes from the lubricant-feeding material 48 onto the inner race 41, the outer race 42, the cage 43 and the rollers 43 to keep the various rails 41a, 42a and the rims 41b lubricated over an extended period of time.

Fifth Embodiment: Rolling Bearing

In a rolling bearing, the cage can be formed by a lubricant-feeding material of the present invention. For example, in the rolling bearing described in JP-A-8-21450, a crown-shaped cage can be formed by the lubricant-feeding material of the present invention.

Figure 8:
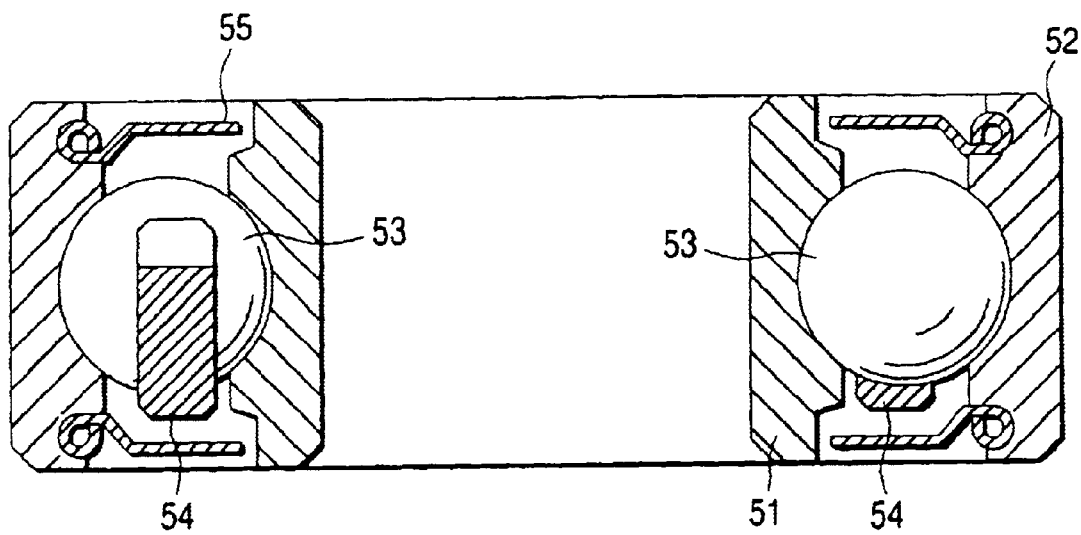
FIGS. 8(a) and 8(b) each is a diagram of a further embodiment of the lubricant-feeding material according to the present invention which is applied to a rolling bearing (FIG. 8 (a) is a sectional view of an essential part of the entire lubricant-feeding material, and FIG. 8 (b) is a perspective view of a cage).
Figure 8:
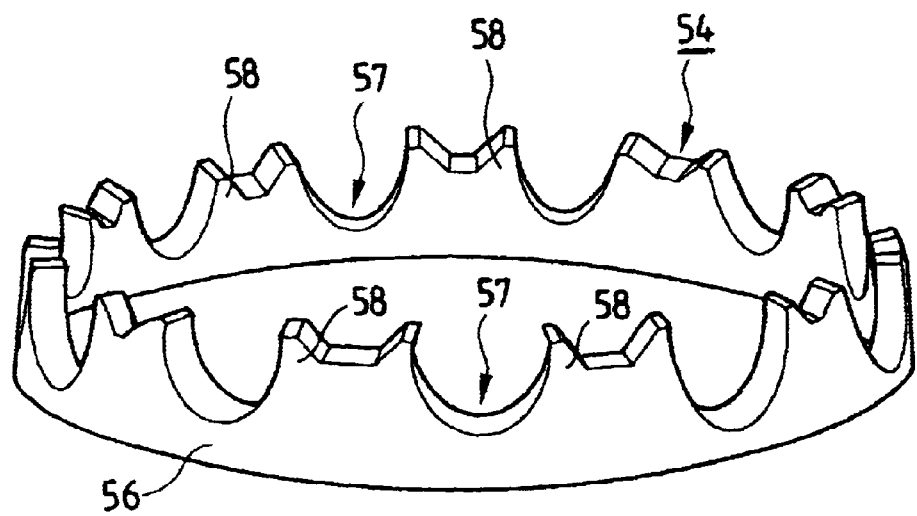

In other words, as shown in a sectional view of FIG. 8 (a), a ball bearing comprises a plurality of balls 53, 53 as rolling elements rollably retained between an inner race 51 and an outer race 52 with a crown-shaped cage 54 provided interposed therebetween. The ball bearing is provided with a sealing plate 55. The crown-shaped cage 54 comprises an annular main portion 56 and a plurality of sets of retaining portions 57, 57 provided on one side of the main portion 56 as shown in FIG. 8 (b). The retaining portions 57, 57 each comprise a pair of elastic pieces 58, 58 which are arranged apart from each other.

In the present invention, the crown-shaped cage 54 acts as the foregoing lubricant-feeding material made of polyester elastomer and lubricant. Accordingly, in the ball bearing, the lubricant gradually oozes from the crown-shaped cage 54 onto the inner race 51, the outer race 52 and the balls 53 to keep these members lubricated over an extended period of time.

EXAMPLES

The present invention will be further described in the following examples, but the present invention should not be construed as being limited thereto.

Compatibility and Solidification Test

As shown in Table 1, to 10 g of a polyester elastomer (Pelprene P-70B, produced by TOYOBO CO., LTD.; hardness: 46 (Shore D hardness); hard component: polybutylene terephthalate; soft component: polyether represented by the foregoing chemical formula (II)) was added 10 g of each of the various lubricants. The mixture was then heated with stirring to a temperature of from 210 to 230° C., which is not lower than the crystalline melting point of the elastomer (200° C.), and then allowed to cool to room temperature so that it was solidified.

During this procedure, the mixture was visually observed for compatibility and solidification. The results are set forth in Table 1 below.

TABLE 1

Results of Compatibility and Cooling/Solidification Tests

| Lubricant | Type and Maker of Lubricant | Compatibilization during Heating | Solidification |
|---|---|---|---|
| Poly-α-olefin oil | SHF82, Mobile Sekiyu K.K. | little compatibilization | Solidified left separated |
| Mineral oil | FBK Oil 150, Nippon Oil Company, LTD. | little compatibilization | Solidified left separated |
| Dialkyl diphenyl Ether | Molesco High Loop LB100, Matsumura Oil Research Corporation | partial compatibilization | Solidified left separated |
| Dioctyl phthalate | DOP, Daihachi Chemical Industry Co., Ltd. | uniform compatibilization | Uniformly solidified |
| Trioctyl Trimellitate | TOTM, Daihachi Chemical Industry Co., Ltd. | uniform compatibilization | Uniformly solidified |
| Pentaphenyl ether | S-3105, Matsumura Oil Research Corporation | uniform compatibilization | Uniformly solidified |

A combination of trioctyl trimellitate, which shows a good compatibility and solidification, as a lubricant with the foregoing polyester elastomer was used to prepare a lubricant-feeding material.

In some detail, 30% by weight of the foregoing polyester elastomer (taking into account the extrusion grade, "Hytrel 4777" (produced by Du Pont-Toray Co., Ltd.; hardness: 47 (Shore D hardness); melt index: 1.5 (220° C.)) was used) and 70% by weight of trioctyl trimellitate ("TOTM", produced by Daihachi Chemical Industry Co., Ltd.) were heated to a temperature of 230° C. with stirring to make complete compatibilization. Thereafter, the molten mixture was cooled and solidified, and then ground by a grinder. The material thus ground was then molded by an injection molding machine with a pumping hopper.

The molded product thus obtained (lubricant-feeding material) allowed the lubricant to ooze from the surface thereof.

As mentioned above, the lubricant-feeding material according to the present invention can be used at temperatures as high as from 100 to 120° C., where the conventional lubricant-feeding materials comprising a polyethylene as a base cannot be used, because the polyester elastomer as a base exhibits a high heat resistance. Further, the lubricant-feeding material according to the present invention can contain a lubricant or grease having a great polarity, e.g., ester oil, which has heretofore been difficultly contained therein.

Moreover, the polyester elastomer exhibits a greater flexibility than polyethylene and thus is particularly suitable for use in applications requiring deformation such as bearing seal.

While the invention has been described in detail and with reference to specific embodiments thereof, it will be apparent to one skilled in the art that various changes and modifications can be made therein without departing from the spirit and scope thereof.

What is claimed is:

1. A rolling bearing comprising an inner race, an outer race, rolling elements, and a cage, wherein the space formed by the inner race, outer race, rolling elements and cage is filled with a lubricant-feeding material comprising a polyester elastomer and at least one of a lubricating oil compatible with the polyester elastomer and a grease comprising the lubricating oil as a base oil, wherein the polyester elastomer comprises a first polyester as a hard component and a second polyester or polyether as a soft component and is solidified containing the at least one of the lubricating oil and grease and the lubricating oil oozes from the surface of the polyester elastomer.

2. A linear guide apparatus comprising a guide rail, a slider, rolling elements, and a seal element which seals the opening of gap between the guide rail and slider and is disposed at both end sides of the slider, wherein a lubricant-feeding material is disposed adjacently or near to a lip portion, which is in contact with the guide rail, of the seal element, the lubricant-feeding material comprising a polyester elastomer and at least one of a lubricating oil compatible with the polyester elastomer and a grease comprising the lubricating oil as a base oil, wherein the polyester elastomer comprises a first polyester as a hard component and a second polyester or polyether as a soft component and is solidified containing the at least one of the lubricating oil and grease and the lubricating oil oozes from the surface of the polyester elastomer.

3. A ball screw apparatus comprising a screw shaft, a nut, and balls, wherein a lubricant-feeding material is disposed in the nut such that the lubricant-feeding material is in contact with the screw outside surface of the screw shaft, the lubricant-feeding material comprising a polyester elastomer and at least one of a lubricating oil compatible with the polyester elastomer and a grease comprising the lubricating oil as a base oil, wherein the polyester elastomer comprises a first polyester as a hard component and a second polyester or polyether as a soft component and is solidified containing the at least one of the lubricating oil and grease and the lubricating oil oozes from the surface of the polyester elastomer.

* * * * *